United States Patent [19]

Stavitsky et al.

[11] 4,437,641
[45] Mar. 20, 1984

[54] MOLD FOR RECORDED DISC

[75] Inventors: David Stavitsky, Plainsboro; Ernest A. Beres, Robbinsville, both of N.J.

[73] Assignee: RCA Corporation, New York, N.Y.

[21] Appl. No.: 418,809

[22] Filed: Sep. 16, 1982

[51] Int. Cl.³ .............................................. B29D 17/00
[52] U.S. Cl. ...................................... 249/79; 249/80; 425/810
[58] Field of Search ................ 425/810; 264/106, 107; 249/79, 80

[56] References Cited

U.S. PATENT DOCUMENTS

| | | | |
|---|---|---|---|
| 1,582,704 | 4/1926 | Sylvester et al. | 425/810 |
| 3,830,459 | 8/1974 | Strausfeld | 249/79 |
| 3,941,547 | 3/1976 | Hunyar | 425/810 X |
| 4,018,552 | 4/1977 | Prast et al. | 425/407 |
| 4,085,178 | 4/1978 | McNeely et al. | 264/106 |
| 4,141,531 | 2/1979 | Strausfeld | 249/80 |
| 4,245,811 | 1/1981 | Brunner et al. | 249/80 |

Primary Examiner—Thomas P. Pavelko
Attorney, Agent, or Firm—Birgit R. Morris; Donald S. Cohen

[57] ABSTRACT

A mold for forming a recorded disc includes a base plate and a cap plate mounted on the base plate. Bolts extending through the base plate and threaded into the cap plate secure the outer portions of the plates together. A hub projecting from the cap plate extends through a hole in the base plate and a nut threaded on the hub and engaging a surface of the base plate secures the inner portions of the plates together. The cap plate has a plurality of sets of grooves in its inner surface which mates with a surface of the base plate. The grooves in each set are radially spaced, concentric, circular grooves connected by slots. An inlet passage extends through the base plate to one of the grooves of each set and an outlet passage extends through the base plate to a groove of each set to provide for a separate flow of a temperature control medium through each set of grooves. The base plate and cap plate are made of materials having suitable physical properties for the specific plate. The cap plate has a mold cavity in its outer surface which is designed to provide a complete filling of the cavity.

23 Claims, 10 Drawing Figures

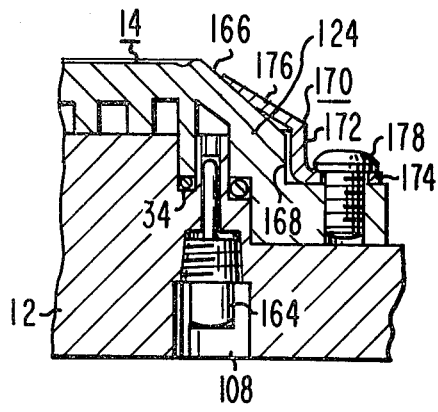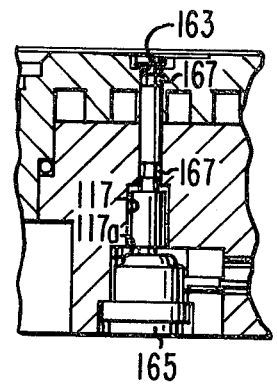
Fig. 5    Fig. 6
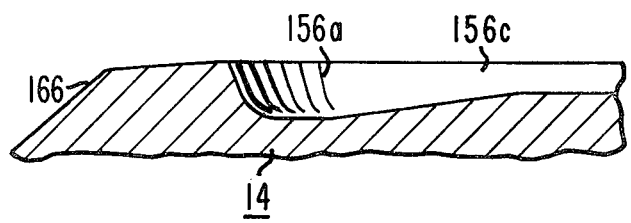
Fig. 7
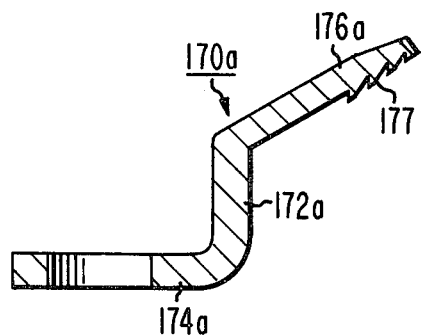
Fig. 8

MOLD FOR RECORDED DISC

BACKGROUND OF THE INVENTION

The present invention relates to a mold for pressing recorded discs and particularly for pressing thermoplastic high density information recorded discs, such as video discs.

The molds which have been used for pressing recorded discs generally include a base plate and a cap plate mounted on and secured to the base plate. The cap plate has a mold cavity in its outer surface and channels in its inner surface which oppose the surface of the base plate. The channels are connected through passages in the base plate to inlet and outlet ports whereby cooling and heating media can be passed through the channels to control the temperature of the surface of the mold cavity. A heating media, such as steam, is used during the molding cycle to heat the thermoplastic molding material so that it can flow to fill the mold cavity. A cooling media, such as water, is used to harden the molding material after the disc is formed. A stamper is mounted on the outer surface of the cap plate across the mold cavity. The stamper is a thin metal plate having on its surface the negative of the surface relief pattern to be formed on the surface of the recorded disc. The outer edge of the stamper is secured to the plate by a ring which holds the stamper tightly against the surface of the cap plate. The recorded disc is pressed by two molds having opposed mold cavities which together form the shape and size of the desired disc.

A problem in pressing molded recorded discs is to eliminate surface defects, such as voids and air blisters. This is particularly desirable for high density information discs where even small surface defects can extend across and adversely affect a relatively large amount of the information on the disc. One factor which can affect surface defects is the proper filling of the cavity of the mold by the molding material. The proper filling of the mold cavity can be affected by the shape of the mold cavity and the control of the heating and cooling of the cavity. Surface defects can also be caused by mechanical factors, such as poor securing of the stamper to the cap plate and mechanical defects in the surface of the cavity in the cap plate.

SUMMARY OF THE INVENTION

A mold for pressing a recorded disc includes a base plate and a cap plate on the base plate. The cap plate has interconnected channels in its inner surface adjacent the base plate and a mold cavity in its outer surface. The channels are connected to inlet and outlet ports in the base plate through passages in the base plate. The channels are arranged in a plurality of separate sets with each set having separate connections to an inlet port. This allows separate heating or cooling media to be fed to each set to provide for separate heating and cooling control zones along the surface of the mold cavity for better and more uniform control of the temperature of the mold cavity.

The mold can include other features including making the cap plate of a material different from that of the base plate which allows the cap plate to be hardened by heat treatment and/or surface treatment so as to provide the mold cavity with a surface which is hard and therefore less subject to being damaged. To allow the cap plate to be made of a material different from that of the base plate, the mold includes apparatus for securing the cap plate to the base plate by means of bolts and seals to achieve a tight fit therebetween. Also, the mold cavity is designed to provide for better filling of the mold cavity by the mold material. In addition, a hold down ring is provided which achieves a good seal between the stamper and the cap plate.

BRIEF DESCRIPTION OF THE DRAWINGS

FIG. 5 is a cross-sectional view taken along line 5—5 of FIG. 1.

FIG. 6 is a cross-sectional view taken along line 6—6 of FIG. 1.

FIG. 7 is an enlarged view of the outer edge portion of the mold cavity in the cap plate.

FIG. 8 is a sectional view of a modification of a stamper hold down ring.

DETAILED DESCRIPTION OF THE PREFERRED EMBODIMENT

Figure 1:
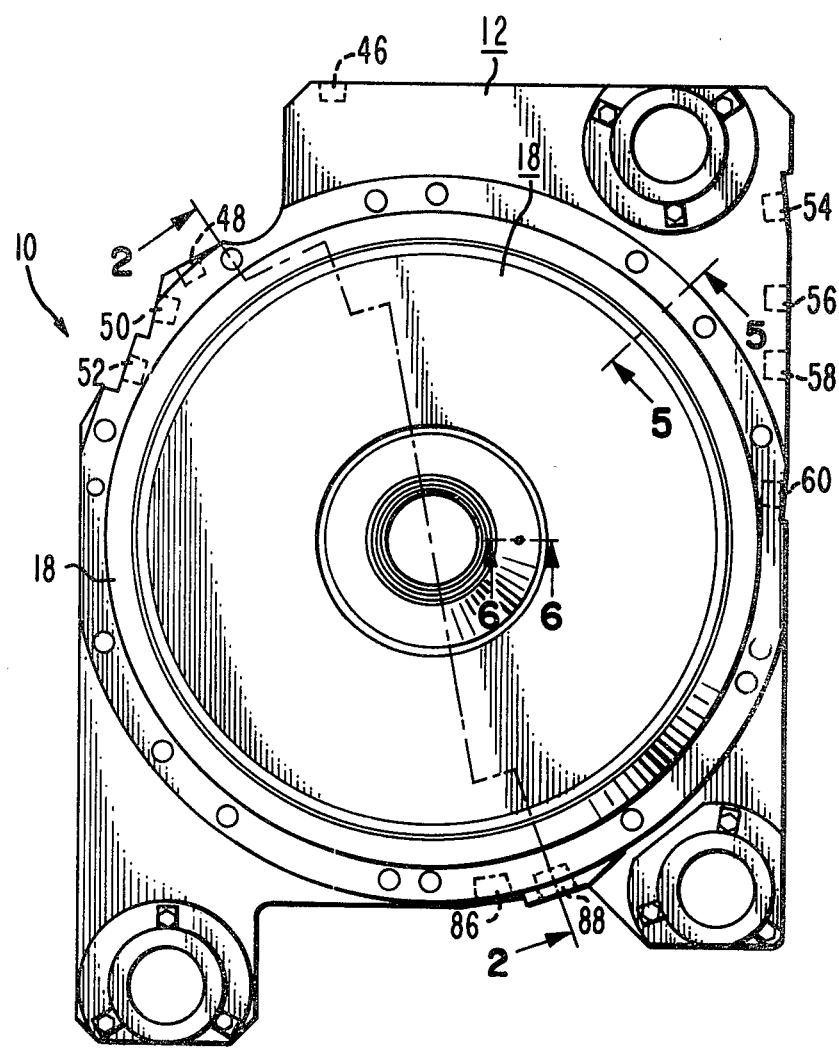
FIG. 1 is a top plan view of a form of the mold of the present invention.
Figure 2:
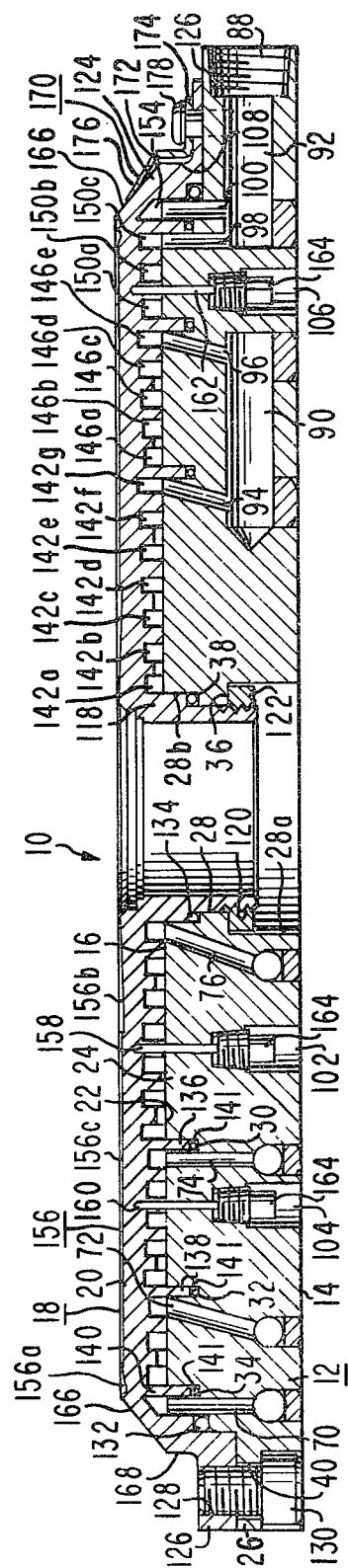
FIG. 2 is a cross-section along line 2—2 of FIG. 1.

Referring initially to FIGS. 1 and 2, one form of the mold of the present invention is generally designated as 10. The mold 10 includes a substantially rectangular, metal base plate 12 having substantially flat outer and inner surfaces 14 and 16. A substantially circular, metal cap plate 18 having outer and inner surfaces 20 and 22 is mounted on the base plate 12 with the inner surface 22 mating with the inner surface 16 of the base plate 12.

Base plate 12 has at its inner surface 16 a cylindrical hub portion 24 projecting beyond an outer flange portion 26 which extends completely around the hub portion 24. The hub portion 24 has a hole 28 extending completely through the center thereof, and three, radially spaced, concentric grooves 30, 32, and 34 in the inner surface 16. The hole 28 has an enlarged diameter portion 28a at the outer surface 14 end of the hole to form a shoulder 36, and an enlarged diameter portion 28b at the inner surface 16 to form a shoulder 38. The flange portion 26 has a plurality of holes 40 therethrough spaced circumferentially around the hub portion 24.

Figure 3:
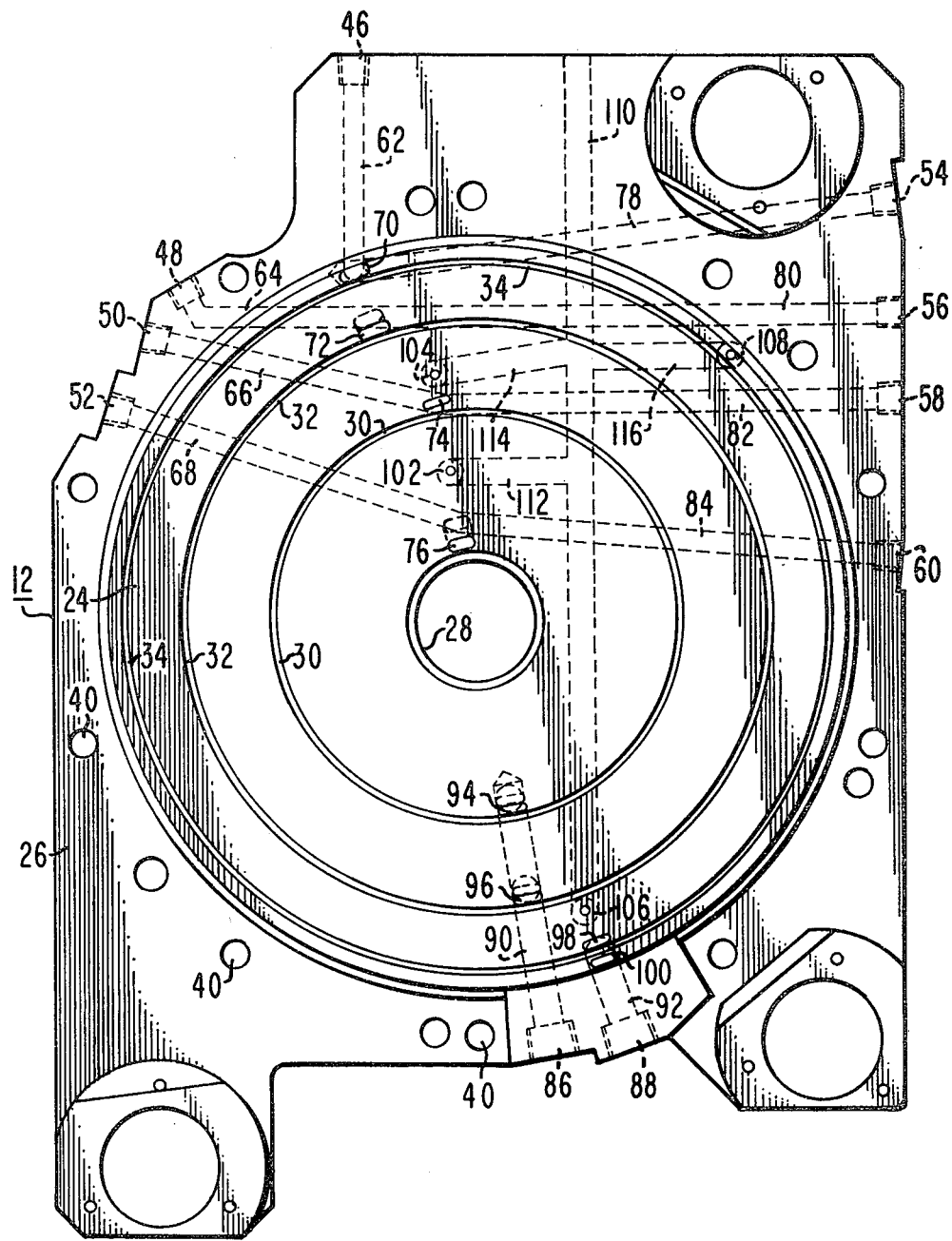
FIG. 3 is a top plan view of the base plate of the mold shown in FIGS. 1 and 2.
Figure 4:
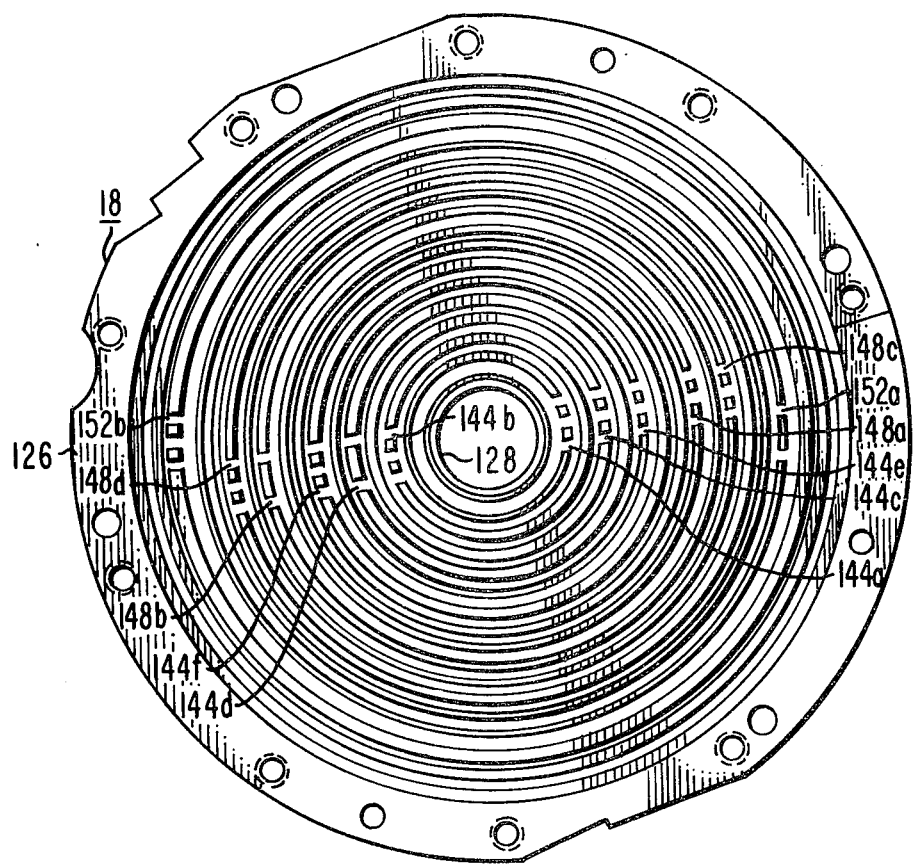
FIG. 4 is a bottom plan view of the cap plate of the mold shown in FIGS. 1 and 2.

As shown in FIGS. 1 and 3, four spaced inlet ports 46, 48, 50, and 52 are in the peripheral edge of the outer flange portion 26 at one corner of the base plate 12. Four spaced additional inlet ports 54, 56, 58, and 60 are in the peripheral edge of the outer flange portion 26 adjacent a different corner of the base plate 12. Separate inlet passages 62, 64, 66, and 68, respectively, extend through the base plate 12 from each of the inlet ports 46–52 respectively to separate inlet riser passages 70, 72, 74, and 76, respectively. The inlet riser passages 70–76 extend to the inner surface 16 of the hub portion 24. Additional inlet passages 78–84 extend from the additional inlet ports 54–60, respectively, to separate ones of the inlet riser passages 70–76. As shown in FIG. 3, the inlet riser passages 70–76 are arranged substantially along a radius of the cylindrical hub portion 24 with the inlet riser passage 70 opening at a point adjacent the outer periphery of the circular groove 34, the inlet riser passage 72 opening at a point adjacent the outer edge of the circular groove 32, the inlet riser passage 74 opening at a point adjacent the outer edge of the groove 32 and the inlet riser passage 76 opening adjacent the center hole 28.

A pair of outlet ports 86 and 88 are in the peripheral edge of the base plate 12 adjacent the corner of the base plate 12 diagonally opposite the corner having the inlet ports 46–52. Outlet passages 90 and 92 extend into the base plate 12 from the outlet ports 86 and 88, respectively. The outlet passage 90 extends to two spaced outlet riser passages 94 and 96, respectively. The outlet passage 92 extends to two spaced outlet riser passages 98 and 100, respectively. The outlet riser passages 94, 96, 98, and 100 are arranged substantially along a radius of the hub portion 24 which is in substantial alignment with the radius along which the inlet riser passages 70–76 are arranged. The outlet riser passage 94 opens at the surface of the hub portion 24 adjacent the inner edge of the circular groove 30, and the outlet riser passage 96 opens at the surface of the hub portion 24 adjacent the inner edge of the circular groove 32. The outlet riser passages 98 and 100 open at the surface of the hub portion 24 adjacent the inner and outer edges of the circular groove 34 respectively.

As shown in FIGS. 2 and 3, the base plate 12 has four holes 102, 104, 106, and 108 extending therethrough between the outer surface 14 and inner surface 16. The hole 102 is located between the circular groove 30 and the center hole 28, the hole 104 is located between the circular grooves 30 and 32, and the hole 106 is located between the circular grooves 32 and 34. As shown in FIG. 5, the hole 108 is located between the circular groove 34 and the outer periphery of the cylindrical hub portion 24. As will be explained later, the holes 102–108 are each adapted to receive a temperature measuring device, such as a thermocouple. As shown in FIG. 3, a passage 110 extends through the base plate 12 from one side thereof to the hole 106. Branch passages 112, 114, and 116 extend from the passage 110 to the holes 102, 104, and 108, respectively. The passages 110–116 are adapted to receive the wires from the thermocouples which are in the holes 102–108. As shown in FIG. 6, the base plate 12 has a hole 117 therethrough adjacent the center hole 28. The hole 117 extends between the outer and inner surfaces 14 and 16 of the base plate 12 and has an enlarged portion 117a at the outer surface 14.

As shown in FIG. 2, the cap plate 18 has a cylindrical hub 118 projecting from the center of its inner surface 22. The cylindrical hub 118 extends through the center hole 28 in the base plate 12 and has a threaded outer surface portion 120 which receives a nut 122. The nut 122 is threaded against the shoulder 36 in the center hole 28 to secure the cap plate 18 to the base plate 12. The cap plate 18 has a cylindrical outer rim 124 which extends around the cylindrical hub portion 24 of the base plate 12 and a flange 126 extends radially outwardly from the rim 124 and is seated on the flange portion 26 of the base plate 12. The cap plate flange 126 has a plurality of holes 128 therethrough which are in alignment with the holes 40 in the flange portion 26 of the base plate 12. Bolts 130 extend through the holes 40 and are threaded into the holes 128 in the cap plate 18 to secure the cap plate 18 to the base plate 12. A sealing ring 132 is provided between the cap plate rim 124 and the base plate 12 and a sealing ring 134 is provided between the cylindrical hub 118 of the cap plate 18 and the ledge 38 of the center hole 28 in the base plate 12. Three circular ribs 136, 138, and 140 project from the inner surface 22 of the cap plate 18 and fit into the circular grooves 30, 32, and 34, respectively in the inner surface 16 of the base plate 12. A separate sealing ring 141 is provided between each of the ribs 136, 138, and 140 and its respective groove 30, 32, and 34.

The cap plate 18 has seven, circular, concentric grooves 142a–142g in its inner surface 22 spaced between the cylindrical hub 118 and the circular rib 136. Radial slots 144a–144f connect adjacent ones of the circular grooves 142a–142g. The grooves 142a–142g are all of the same cross-sectional area. However, the grooves 142a–142g vary in depth and width with the radially innermost groove 142a being the shallowest and widest with the remaining grooves 142b–142g increasing in depth and decreasing in width to the outermost groove 142g which is the deepest and narrowest. The radially innermost groove 142a extends across the open end of the inlet riser passage 76, and the outermost groove 142g extends across the open end of the outlet riser passage 94. A second set of circular, concentric grooves 146a–146e are in the inner surface 22 of the cap plate 18 and are spaced between the circular ribs 136 and 138. Adjacent ones of the grooves 146a–146e are connected by radial slots 148a–148d respectively. The grooves 146a–146e are all of the same cross-sectional area but vary in depth and width. The innermost groove 146a is the shallowest and widest and the grooves increase in depth and decrease in width to the outermost groove 146e which is the deepest and narrowest. The innermost groove 146a extends across the open end of the inlet riser passage 74 and the outermost groove 146e extends across the open end of the outlet riser passage 96. A third set of circular, concentric grooves 150a, 150b, and 150c is provided in the inner surface 22 of the cap plate 18 with the grooves 150a–150c being spaced between the circular ribs 138 and 140. Radial slots 152a and 152b connected adjacent ones of the grooves 150a–150c. The grooves 150a–150c are all of the same cross-sectional area but are of different depths and widths with the innermost groove 150a being the shallowest and widest and the outermost groove 150c being the deepest and narrowest. The innermost groove 158 extends across the open end of the inlet riser passage 14 and the outermost groove 150c extends across the outlet riser passage 98. A circular groove 154 is provided in the inner surface 22 of the cap plate 18 between the circular rib 140 and the outer rim 124. The groove 154 extends across the open ends of the inlet riser passage 70 and the outlet riser passage 100.

In the outer surface 20 of the cap plate 18 is a mold cavity 156. The mold cavity 156 is of a size and shape corresponding to one-half the recorded disc being molded. The mold cavity 156 has a depression 156a around its outer edge which forms the rim of the disc being molded and a depression 156b around its inner edge adjacent the inner surface of the cylindrical hub 118 which forms the center unrecorded portion of the recorded disc. Between the rim depression 156a and the center depression 156b is the intermediate portion 156b in which the recorded portion of the disc is formed. The bottom of the intermediate portion 156c tapers from the deepest portion at the rim depression 156a to the shallowest at the center depression 156b. To achieve good filling of the mold cavity 156, the taper of the bottom of the intermediate portion 156c should be at an angle of at least eight minutes. The exact angle can vary depending on the depth of the intermediate portion 156c, which depends on the thickness of the recorded disc being molded, and the thickness of the cap plate 18. The thicker the disc being formed, which provides a deeper intermediate portion 156c, the larger the angle of the bottom of the intermediate portion 156 can be. Of course, deepening the intermediate portion 156c will also require a thicker cap plate 18.

The cap plate 18 has three holes, 158, 160, and 162 in its inner surface 22 which are aligned with the holes 102, 104, and 106, respectively, in the base plate 12. Each of the holes 158, 160, and 162 receives the end of a thermocouple 164 which is mounted in the respective mating hole 102, 104, and 106. The cap plate 18 also has a hole 163 therethrough from its inner surface 20 to the bottom of the mold cavity 156 which hole 163 is in alignment with the hole 117 in the base plate 12 as shown in FIG. 6. The aligned holes 163 and 117 receive a pressure transducer 165 which measures the pressure on the material in the mold cavity 156. The pressure transducer 165 has a pair of sealing rings 167 therearound which are above and below the grooves in the cap plate 18 to prevent any fluid from the grooves from flowing along the pressure transducer 165.

The rim 124 of the cap plate 18 has a tapered surface 166 which extends from the outer surface 20 of the cap plate 18 to the cylindrical outer surface 168 of the rim 124. The tapered surface 166 is adapted to receive and have clamped thereto the outer edge of a stamper. A stamper clamping ring 170 extends around the rim 124. The clamping ring 170 has a cylindrical arm 172 extending around the cylindrical surface 168 of the rim 124, a base 174 extending radially outwardly from an end of the arm 172 and seated on the flange 126 and a clamping arm 176 extending inwardly from the other end of the cylindrical arm 172 over the tapered surface 166 of the rim 124. The clamping ring 170 is secured to the cap plate 18 by screws 178 extending through the base 174 of the clamping ring 170 and threaded into the flange 126 of the cap plate 18 and the flange portion 26 of the base plate 12. The internal angle between the clamping arm 176 and cylindrical arm 172 of the clamping ring 170 is less than the internal angle between the tapered surface 166 and cylindrical surface 168 of the rim 124. Thus, when the clamping ring 170 is secured to the mold 10 by the screws 178, the end of the clamping arm 176 is forced against the tapered surface 166 to tightly clamp the outer edge of a stamper between the clamping arm 176 and the tapered surface 166. Referring to FIG. 8, a modification of the stamper clamping ring is generally designated as 170a. The clamping ring 170a includes a cylindrical arm 172a, a base 174a, and a clamping arm 176a which are of the same construction as the corresponding parts of the clamping ring 170. However, the clamping arm 176a has serrations 177 along the outer portion of its inner surface. The serrations provide teeth which bite into the stamper when the clamping arm 176a is brought into contact with the stamper to more tightly secure the edge of the stamper between the clamping arm 176a and the tapered surface 166.

In the molds of the prior art, the cap plate was generally secured to the base plate by brazing. Thus, the cap plate and base plate had to be made of compatible materials which would permit the achievement of a good brazed joint therebetween. However, in the mold 10 the cap plate 18 is secured to the base plate 12 by means of the bolts 130 and the nut 122. Thus, the cap plate 18 and base plate 12 can be made of different materials which permits the cap plate 18 and base plate 12 to be made of materials more suitable for the specific functions of the two plates. For example, as will be explained in more detail later, during the molding of a recorded disc the mold cavity 156 is heated or cooled by passing a temperature control medium through the grooves in the inner surface 22 of the cap plate 18. To achieve a better flow of heat between the grooves and the mold cavity 156, the cap plate 18 may be made of a metal which is a good conductor of heat whereas the base plate 12 may be made of a metal which is not as good a heat conductor. Also, it is desirable that the surface of the mold cavity 156 be hard so that it is less subject to be dented or otherwise damaged. For this purpose, the cap plate 18 can either be made of a hard material or can be heat treated so as to be hardened. Also, the outer surface 20 of the cap plate 18 can be treated or coated so as to be harder than the rest of the cap plate 18. However, if desired, the base plate 12 can be made of a material which is not as hard as the material of the cap plate 18.

To form a recorded disc, two of the molds 10 are used with the molds 10 being mounted on the opposed platens of a mold press with the mold cavities 156 of the molds 10 facing each other. Prior to mounting the molds 10 on the platens of the press a stamper is mounted across the mold cavity 156. A stamper is a thin metal plate having on the surface thereof the negative of the impression to be applied to the surface of the recorded disc. The stamper is mounted in the mold cavity 156 with the outer edge extending across the tapered surface 166 of the rim 124. The outer edge of the stamper is tightly secured to the tapered surface 166 by the clamping arm 176 of the clamping ring 170. The stamper has a hole through the center thereof and the inner edge of the stamper is secured to the mold 10 by a center plate which fits in the hub 118 of the cap plate 18. One such center plate and its manner of securing the stamper to the mold is shown in U.S. Pat. No. 4,327,047 to M. L. McNeely, issued Apr. 27, 1982, entitled "Method for Producing Disc Records Having Molded-In Center Holes". To form a recorded disc with a center hole, the center plate secured to one of the molds 10 has therein a center hole forming pin such as shown in the above-identified U.S. Pat. No. 4,327,047.

With the molds 10 having the stampers thereon secured to the platens of a mold press, the surface of the mold cavities 156 are then heated. This is achieved by passing steam into each of the inlet ports 46, 48, 50, and 52. The steam entering the inlet port 52 flows through the inlet passage 68 and inlet riser passage 76 into the circular groove 142a. After filling the groove 142a the steam flows radially outwardly to fill in succession each of the grooves 142b–142g. The steam then flows through the outlet riser passage 194, the outlet passage 90 and out through the outlet port 86. The steam entering the inlet port 50 flows through the inlet passage 60 and inlet riser passage 74 to enter the circular groove 146a. The steam then flows radially outwardly to fill in succession each of the grooves 146b–146e. The steam then flows through the outlet riser passage 96 to the outlet passage 90 and the outlet port 86. Similarly, steam entering the inlet port 48 flows through the inlet passage 64 and inlet riser passage 72 into the circular groove 150a. After filling the groove 150a the steam flows radially outwardly to fill the grooves 150b and 150c. The steam then flows through the outlet riser passage 98 and outlet passage 96 to the outlet port 88. The steam entering the inlet port 46 flows through the inlet passage 62 and inlet riser passage 70 to the circular groove 154. After filling the groove 154 the steam flows through the outlet riser passage 100 to the outlet passage 96 and outlet port 88.

Thus, there is provided four separate flows of steam across four separate sections of the cap plate 18. By controlling the temperature and/or the flow of each of the flows of steam, a desired temperature profile can be obtained across the radius of the mold cavity 156. This temperature profile can be uniform or nonuniform as desired. The particular temperature of the steam in each of these sections is measured by the respective thermocouple 164 in that section. When the steam enters the first groove in a particular section, it is the hottest and the steam cools slightly as it flows from groove to groove. However, since the first groove is the shallowest, the heat from the steam in the first groove has further to go across the thickness of the capping plate 18 to the mold cavity 56 than the cooler steam in the last groove which is the deepest. Thus, the amount of heat reaching the mold cavity 156 from each of the grooves in a section is equal so as to provide a uniform temperature across each section of the cap plate 18.

Although the radially innermost groove 142a is shown as being the shallowest of its set of grooves, it may be desirable to make that particular groove deeper. This innermost groove 142a not only provides for heating and cooling the adjacent portion of the mold cavity 156 but also can provide some heating and cooling of the adjacent portion of the center plate in the hub 118. Thus, it may be desirable to make the innermost groove 142 deeper to achieve the additional heating and cooling.

After the mold cavities 156 are heated to a desired temperature, a preform of the thermoplastic material to be molded is placed between the molds 10 at the center thereof as shown in U.S. Pat. No. 4,327,047. The platens of the mold press are moved to move the molds 10 together to contact the preform and thereby heat the preform to its softening temperature. Further movement of the molds together compresses the heated preform and causes the material to flow radially outwardly to fill the mold cavities 156. By controlling the temperature profile across the mold cavities 156, complete filling of the mold cavities by the material of the preform can be accomplished. As was previously described, the angle of the taper of the bottom surface of the mold cavity 156 assists in achieving a complete filling of the mold cavity. When the two molds 10 come together to close the mold cavities, any excess plastic material is forced radially outwardly between the outer edges of the molds 10 to form a flash around the disc being molded. The flow of this flash material affects the proper filling of the mold cavities particularly around the rim portion 156a. The steam in the circular groove 154 controls the temperature of the flash material to provide the proper flow of the flash material so as to further assist in achieving a proper filling of the mold cavities 156.

When the mold cavities 156 are closed and are completely filled with the plastic material, the mold cavities 156 are cooled to harden the plastic material and form the molded disc. This cooling is achieved by stopping the flow of steam through the grooves 142a–142g, 146a–146e, 150a–150c, and 154, and is replaced by a flow of water. The water may be admitted through the inlet ports 46, 48, 50, and 52, but is preferably admitted through the additional inlet ports 54, 56, 58, and 60. The water will flow through the various sets of grooves in the same manner as the steam to cool the mold cavities 156 and thereby cool the plastic material of the molded disc. When the molded disc is cooled to the desired temperature, the molds 10 are separated and the molded disc removed therefrom.

Thus, there is provided by the present invention a mold for molding recorded discs which includes means for controlling the temperature profile across the mold cavity. The temperature control means includes a plurality of sets of grooves in the inner surface of the cap plate through which separate flows of a temperature control medium can be provided. Thus, the separate set of grooves divide the mold cavity into separate zones, the temperatures of which can be separately controlled to provide a desired temperature profile across the mold cavity. The grooves in each set are designed to provide a uniform temperature across each zone even though the temperature of the medium may vary as it flows through the set of grooves. The ability to control the temperature profile across the mold cavity along with the angle of the bottom surface of the mold cavity serves to achieve a better filling of the mold cavity. This provides a molded disc having fewer defects. Also by being able to control the heating and cooling of the disc material, it is possible to control the stresses in the material. This controls the warping of the discs not only as the discs are being molded but also possible warping during future use of the disc. The mold of the present invention, by having the cap plate mechanically secured to the base plate, permits the cap plate and base plate to be made of materials which may be different and which are best suited for the particular function of each of the plates. By making the cap plate of a material having good heat conductivity good flow of heat between the surface of the mold cavity and the grooves is provided, and the mold requires less energy to achieve the desired heating and cooling of the disc material. By hardening the surface of the cap plate, the disc is provided with a smoother and flatter surface.

Figure 9:
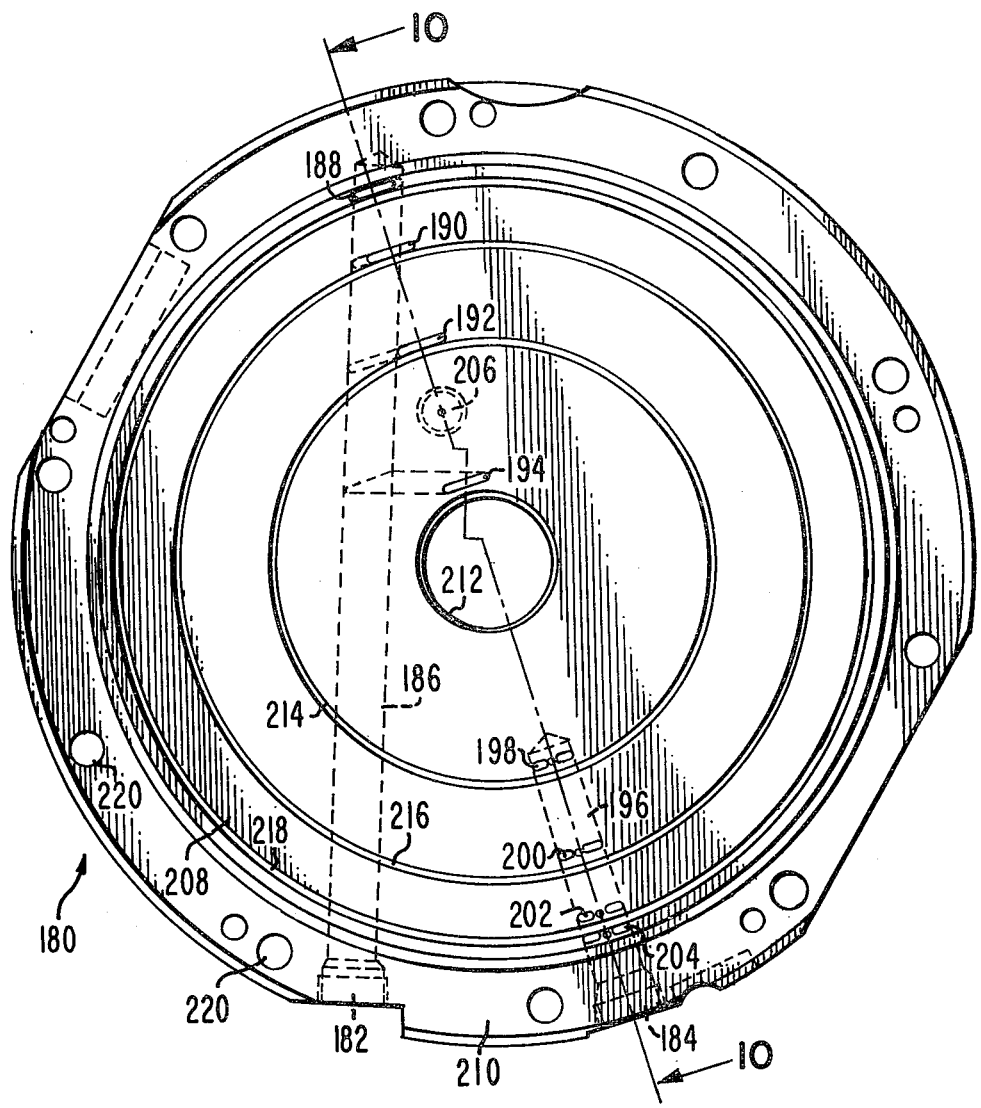
FIG. 9 is a top plan view of a modification of the base plate.
Figure 10:
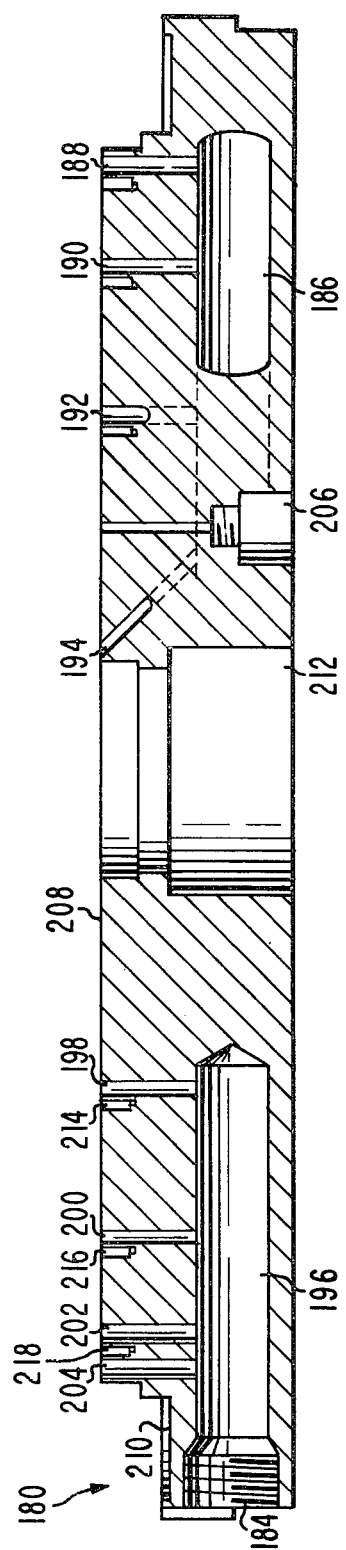
FIG. 10 is a cross-sectional view taken along line 10—10 of FIG. 9.

Referring to FIGS. 9 and 10, a modification of the base plate which can be used in the mold of the present invention is generally designated as 180. The base plate 180 is similar in construction to the base plate 12 shown in FIGS. 1, 2 and 3 except that the base plate 180 is round rather than rectangular. Also, the base plate 180 has only a single inlet port 182 and a single outlet port 184 rather than a plurality of inlet and outlet ports. The inlet port 182 is connected by a single inlet passage 186 to four spaced inlet riser passages 188, 190, 192 and 194 which correspond to the inlet riser passages 70–76 in the base plate 12. The outlet port 184 is connected by a single outlet passage 196 to four spaced outlet riser passages 198, 200, 202 and 204 which correspond to the outlet riser passages 94–100 in the base plate 12. In addition, the base plate 180 has only a single hole 206 therethrough for a thermocouple.

The base plate 180, like the base plate 12, has a cylindrical hub portion 208 projecting beyond and surrounded by a flange portion 210. A hole 212 extends through the center of the hub portion 208 and is adapted to receive the cylindrical hub 118 of a cap plate 18. The hub portion 208 has three, radially spaced, concentric, circular grooves 214, 216 and 218 in its surface which correspond to the grooves 30, 32 and 34 in the hub portion 24 of the base plate 12. The grooves 214, 216 and 218 receive the ribs 136, 138 and 140 of a cap plate 18. The inlet riser passages 190 and 192 open at the surface of the hub portion 208 adjacent the outer edge of the circular grooves 216 and 214 respectively and the inlet riser passage 194 opens adjacent the hole 212. The outlet riser passages 198, 200 and 202 open at the surface of the hub portion 208 adjacent the inner edge of the grooves 214, 216 and 218 respectively. The inlet riser passage 188 and outlet riser passage 204 open at the surface of the hub portion 208 between the groove 218 and the outer edge of the hub portion 208. The flange portion 210 has a plurality of circumferentially spaced holes 220 therethrough through which extend bolts for securing a cap plate 18 to the base plate 180.

To form a complete mold, a cap plate 18 is mounted on and secured to the base plate 180 in the same manner as shown and described previously with regard to FIG. 2. This forms a mold having a plurality of sets of grooves through which a temperature control medium, such as steam or water, can flow to control the temperature of the mold cavity in the mold. With the base plate 180, only a single flow of the temperature control medium is used to provide the temperature control medium to all of the sets of grooves. To control the temperature across each set of grooves, the rate of flow of the temperature control medium into each set of grooves is controlled. This is achieved by varying the size of either the inlet riser passage and/or the outlet riser passage for each set of grooves by means of plugs inserted in the particular riser passages before the cap plate 18 is mounted on the base plate 180.

Although the mold using the base plate 180 does not have the versatility of the mold using the base plate 12 for controlling the temperature profile across the mold cavity, it does have certain advantages in a production mold where a desired temperature profile has been determined and fixed. The predetermined and fixed temperature profile can be achieved by appropriately plugging up portions of the various inlet and outer riser passages and the mold then only requires a single inlet hose and a single outlet hose to be connected thereto. This much simplifies the overall construction, set up and operation of the mold while still providing the mold with most of the other advantages previously described.

We claim:

1. A mold for molding a recorded disc comprising:
a base plate having inner and outer surfaces,
a cap plate having inner and outer surfaces mounted on the base plate with the inner surface of said cap plate in opposed mating relation with the inner surface of the base plate, said cap plate having a mold cavity in its outer surface, and a plurality of separate sets of interconnected grooves in its inner surface, and
means in said base plate for providing a flow of temperature control medium to each of said sets of grooves including separate inlet and outlet passages to each set of grooves.

2. A mold in accordance with claim 1 in which each set of grooves includes a plurality of concentric, radially spaced, circular grooves which are interconnected by radially extending slots in the inner surface of the cap plate.

3. A mold in accordance with claim 2 in which the grooves in each set are approximately of the same cross-sectional areas but vary in depth and width.

4. A mold in accordance with claim 3 in which the groove at one radial end of the set is the deepest and narrowest and the groove at the other radial end of the set is the shallowest and widest.

5. A mold in accordance with claim 4 in which the base plate has for each set of the grooves an inlet passage extending to the inner surface thereof at the shallowest groove and an outlet passage extending to the inner surface thereof at the deepest groove.

6. A mold in accordance with claim 5 in which the grooves of all the sets are concentric with each other and are arranged to extend across the mold cavity to provide control of the temperature of the mold cavity.

7. A mold in accordance with claim 6 including sealing means between the inner surfaces of the cap plate and base plate at each side of each set of grooves.

8. A mold in accordance with claim 7 in which the sealing means includes circular ribs projecting from the inner surface of the cap plate, circular grooves in the inner surface of the base plate into which the ribs extend and a sealing ring between the end of each rib and the bottom of its respective groove.

9. A mold in accordance with claim 5 in which each inlet passage extends from a separate inlet port in the side of the base plate, and each outlet passage extends from an outlet port in the side of the base plate.

10. A mold in accordance with claim 9 in which a plurality of the outlet passages extend to a single outlet port.

11. A mold in accordance with claim 9 including two separate inlet passages extending to each set of grooves with each of the two inlet passages extending to a separate inlet port.

12. A mold in accordance with claim 5 in which each of the inlet passages is connected to a single inlet port in the side of the base plate and each of the outlet passages is connected to a single outlet port in the side of the base plate.

13. A mold in accordance with claim 12 in which a single inlet passage extends from the inlet port through the base plate and separate riser inlet passages extend from the inlet passage to the inner surface of the base plate for each set of grooves, a single outlet passage extends from the outlet port through the base plate and a separate riser outlet passage extends from the outlet passage to the inner surface of the base plate for each set of grooves.

14. A mold in accordance with claim 1 in which the mold cavity has a circular outer periphery and at least a portion of the bottom surface of the cavity is tapered radially along the cavity from a deepest portion adjacent the outer periphery of the cavity to a shallowest portion adjacent the center of the cavity with the taper being at an angle of at least eight minutes.

15. A mold in accordance with claim 1 including removable means securing the cap plate to the base plate.

16. A mold in accordance with claim 15 in which the removable means securing the cap plate to the base plate includes bolts extending through one of said plates and threaded into the other plate.

17. A mold in accordance with claim 16 in which the removable means securing the cap plate to the base plate also includes a cylindrical hub projecting from the inner surface of the cap plate and extending through a hole in the base plate and a nut is threaded on the hub and engages a surface on the base plate.

18. A mold in accordance with claim 15 in which the base plate includes a cylindrical hub portion and a flange portion extending outwardly from the periphery of the hub portion, the hub portion projecting above the flange portion, and the cap plate is circular and is mounted on the hub portion of the base plate, the cap plate has a cylindrical rim which fits around the peripheral surface of the hub portion of the base plate and a flange projecting radially outwardly from the rim and seated on the flange of the base plate.

19. A mold in accordance with claim 18 in which the means securing the cap plate to the base plate includes bolts extending through holes in the flange of the base plate and threaded into holes in the cap plate.

20. A mold in accordance with claim 19 in which the base plate has a hole therethrough at the center of the hub portion, the cap plate has a cylindrical hub extending from the center thereof through the hole in the base plate and a nut is threaded on the hub and engages a surface of the base plate to secure the center of the cap plate to the base plate.

21. A mold in accordance with claim 1 in which the cap plate and base plate are made of materials having different physical properties.

22. A mold in accordance with claim 21 in which the cap plate is made of a material which has a higher thermal conductivity than the material of the base plate.

23. A mold in accordance with claim 21 in which the cap plate is made of a material which is harder than the material of the base plate.

* * * * *